3,194,842
PREPARATION OF ALKYLATED DECABORANES
Murray S. Cohen, Dover, and Carl E. Pearl, Morristown, N.J., assignors, by mesne assignments, to Thiokol Chemical Corporation, a corporation of Delaware
No Drawing. Filed July 1, 1955, Ser. No. 519,626
9 Claims. (Cl. 260—606.5)

This invention relates to a novel process for the preparation of liquid, lower alkylated decaboranes.

The process of the present invention has the advantage of providing a method for the manufacture of alkyl decaboranes by the use of the readily available olefins and can be carried out in a simple apparatus at atmospheric pressure.

The process of the present invention comprises introducing an olefin hydrocarbon containing from two to five carbon atoms, for example, ethylene, propylene or one of the butenes, into a solution of decaborane in a suitable saturated hydrocarbon solvent at about atmospheric pressure in the presence of aluminum chloride or aluminum bromide as a catalyst. The reaction proceeds at advantageous rates in the range of about 70–100° C. but temperatures of about 55–200° C. can be used.

Suitable solvents are those which are not reactive with decaborane or the aluminum halides and include aliphatic and alicyclic hydrocarbons of suitable boiling point. n-Heptane or other heptanes and octanes, including, for example, 2,2,4-trimethylpentane, "Skellysolve-C" or the like can be used. In addition, cyclohexane, ethylcyclohexane and dimethylcyclohexane, are examples of alicyclic hydrocarbons suitable for use in this process.

The proportion of aluminum halide is advantageously approximately 1 mole per mole of decaborane to be alkylated but this may vary from 0.1 to 5 moles or more. The smaller proportions make the reaction proceed more slowly and more than about 5 moles per mole of decaborane appear to be unnecessary.

The proportion of ethylene or other olefins used can vary over a wide range but usually at least 1 mole per mole of decaborane will be used. Smaller proportions lead to considerable unreacted decaborane in the product. As much as four or five moles of ethylene per mole of decaborane can be used, the larger proportions yielding larger amounts of polyalkylated decaboranes.

The olefin is passed as a gas slowly through the reaction mixture so that most of the gas is absorbed. The time of reaction will depend on the amount of olefin introduced and can vary from one to five hours for a batch of 0.25 g. mole of decaborane. Longer times may be required for the alkylation of larger batches.

After the reaction is completed, the catalyst is decomposed by pouring the reaction mixture over ice, separating, drying and distilling the organic layer. Suitably the alkylated decaborane product is recovered by vacuum distillation.

*Example I*

A three-necked flask was fitted with a thermometer, gas inlet, stirrer and reflux condenser. The flask was charged with 30.5 g. (0.25 mole) of decaborane and 33.4 g. (0.25 mole) of aluminum chloride in 400 ml. of methylcyclohexane. The solution was heated to refluxing and 0.6 mole of pure, dry ethylene gas was slowly introduced so that most of the gas was absorbed. The time for this complete addition was 2.25 hours, during which period the solution darkened considerably. After standing at room temperature overnight, the solution was poured into 100 g. of wet ice. The organic layer was separated and quickly dried over anhydrous calcium chloride. The solution was distilled at reduced pressure and a liquid fraction boiling at 74 to 155° C. at 0.1 mm. of mercury was collected. This fraction was shown by infrared spectrophotometry to contain ethyl decaborane, 22% unreacted decaborane and some higher alicyclic hydrocarbons. Purified ethyl decaborane can be recovered from this fraction by further fractionation, if desired.

The compositions produced in accordance with our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The compositions produced in accordance with our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products produced in accordance with our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of the ethyldecaborane, containing about 72 percent by weight of boron, for example, this local fuel to air ratio by weight is approximately 0.072. For the higher energy fuels produced in accordance with the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products produced in accordance with the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet. The products produced in accordance with our invention can also be employed as aircraft gas turbine fuels is admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon and hydrocarbon fuel present in the mixture, and consistent with the air dilution required to maintain the gas temperatures of these mixtures within accepted turbine operating temperatures.

Because of their high chemical reactivity and heating values, the products produced in accordance with our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products produced in accordance with our invention eliminates the need of flameholding devices within the combustion zone of the afterburner. When employed in an afterburner, the fuels produced in accordance with our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with our invention will improve the combustion process of the ramjet in much the same manner as that described for the afterburner because of their improved chemical reactivity over that of simple hydrocarbon fuels. When employed in a ramjet the fuels produced in accordance with our invention will be simply substituted for hydrocarbon fuels and used in the established manner.

We claim:

1. A method for the production of a liquid, lower alkylated decaborane which comprises reacting decaborane and a monoolefin hydrocarbon having from two to five carbon atoms at a temperature within the range from about 55° to 200° C. while the decaborane is dissolved in a saturated hydrocarbon containing an effective amount of an aluminum halide selected from the group consisting of aluminum bromide and aluminum chloride.

2. The method of claim 1 wherein the monoolefin hydrocarbon is ethylene.

3. The method of claim 1 wherein the aluminum halide is aluminum bromide.

4. The method of claim 1 wherein the aluminum halide is aluminum chloride.

5. The method of claim 1 wherein from 1 to 5 moles of monoolefin hydrocarbon per mole of decaborane are used, wherein from 0.1 to 5 moles of aluminum halide per mole of decaborane are used, and wherein the reaction temperature is within the range from 55 to 200° C.

6. A method for the production of a liquid, lower ethyldecaborane which comprises reacting decaborane and from 1 to 5 moles of ethylene per mole of decaborane at a temperature within the range from 55 to 200° C. while the decaborane is dissolved in a saturated hydrocarbon containing from 0.1 to 5 moles, per mole of decaborane, of an aluminum halide selected from the group consisting of aluminum bromide and aluminum chloride.

7. The method of claim 6 wherein said saturated hydrocarbon is methylcyclopentane.

8. The method of claim 6 wherein the aluminum halide is aluminum bromide.

9. The method of claim 6 wherein the aluminum halide is aluminum chloride.

References Cited by the Examiner

UNITED STATES PATENTS 2,236,099  3/41  Ipatieff et al. _____ 260—683.4

TOBIAS E. LEVOW, *Primary Examiner.*

ROGER L. CAMPBELL, CARL D. QUARFORTH,
*Examiners.*